United States Patent
Steinemann et al.

[15] 3,683,616
[45] Aug. 15, 1972

[54] ANTI-MAGNETIC TIMEKEEPING MECHANISMS

[72] Inventors: Samuel Steinemann, Liestal; Lucien Levenberger, Waldenburg, both of Switzerland

[73] Assignee: Institut Dr. Ing Reinhard Straumann A.G., Waldenburg, Switzerland

[22] Filed: July 29, 1969

[21] Appl. No.: 860,132

[30] Foreign Application Priority Data

Aug. 19, 1968   Switzerland............12466/68

[52] U.S. Cl. .............................................. 58/106.5
[51] Int. Cl. ........................................... G04b 43/00
[58] Field of Search ................... 58/88, 106.5, 107

[56] References Cited

UNITED STATES PATENTS

| | | |
|---|---|---|
| 385,945 | 7/1888 | O'Hara et al. ............58/106.5 |
| 385,946 | 7/1888 | O'Hara et al. ............58/106.5 |
| 385,947 | 7/1888 | O'Hara et al. ............58/106.5 |
| 385,948 | 7/1888 | O'Hara et al. ............58/106.5 |
| 385,949 | 7/1888 | O'Hara et al. ............58/106.5 |
| 385,950 | 7/1888 | O'Hara et al. ............58/106.5 |
| 385,951 | 7/1888 | O'Hara et al. ............58/106.5 |
| 385,952 | 7/1888 | O'Hara et al. ............58/106.5 |
| 385,953 | 7/1888 | O'Hara et al. ............58/106.5 |
| 385,954 | 7/1888 | O'Hara et al. ............58/106.5 |
| 385,955 | 7/1888 | O'Hara et al. ............58/106.5 |

Primary Examiner—Richard B. Wilkinson
Assistant Examiner—George H. Miller, Jr.
Attorney—McGlew and Toren

[57] ABSTRACT

Time-keeping mechanism having magnetic operating parts but exhibiting truly non-magnetic properties. All parts of the mechanism that are mounted on the balance staff and the pallet arbor, the escapement wheel as well as at least the main portion of the balance staff are made of a material having a magnetic permeability of less than 1.01.

12 Claims, 9 Drawing Figures

Patented Aug. 15, 1972

INVENTORS
SAMUEL STEINEMANN
LUCIEN LEUENBERGER

BY McGlew and Toren
ATTORNEYS

INVENTORS
SAMUEL STEINEMANN
LUCIEN LEUENBERGER
BY McGlew and Toren
ATTORNEYS

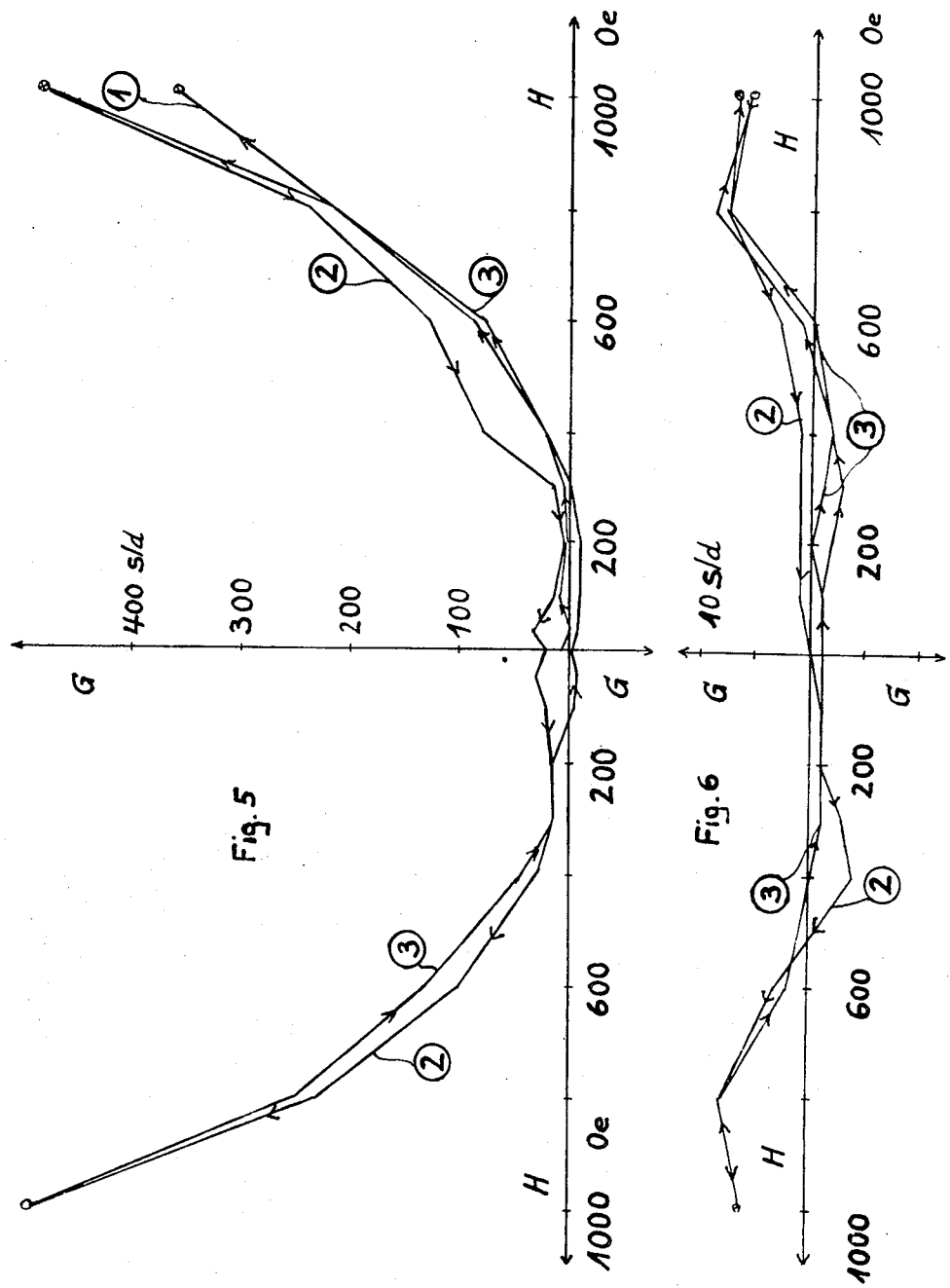

ANTI-MAGNETIC TIMEKEEPING MECHANISMS

BACKGROUND OF THE INVENTION

This invention relates to a timekeeping mechanism which has antimagnetic characteristics.

As early as in 1933 (Bulletin Annuel Societe Suisse de Chronometric Vol. 1, pp. 52–57) a detailed study was published concerning the effects of a magnetic field on the timekeeping performance of clocks and watches. In this article and on subsequent occasions, the disturbances of a timing mechanism in a magnetic field have been ascribed above all to the balance spring, it being considered that the modulus of elasticity of the metal is directly altered when this metal is exposed to the magnetic field. The magneto-mechanical effects, utilized for the temperature compensation of the modulus of elasticity, are in fact disturbed by magnetic fields, particularly in the case of balance spring alloys whose Curie temperature lies a considerable distance above the temperature of utilization. On the other hand, these disturbances, which directly and solely derive from the balance spring, are never as large as the temporary disturbances (disturbances, which occur in the magnetic field in the case of watches and clocks) which are observed in the complete timekeeping mechanism and the residual effects (disturbances which remain when the temporary effects of a magnetic field cease to be operative).

Magnetic fields which can affect wrist watches are produced today by a number of machines and apparatuses, for example, motors of household machines, magnets in the headphones of telephone equipments, magnets in children's toys, magnetically attachable objects such as cigarette boxes and coin holders in automobiles, magnetic pencils and ticket holders, magnetic closure elements on refrigerator doors. Also, larger timekeeping mechanisms, for example in sports equipment, may be subject to magnetic fields. The effective field strengths of such magnets may amount to as much as 100 Oersted at a distance of a few centimeters. Since it is known that magnetic fields affect the performance of watches, so-called antimagnetic watches were brought on to the market. The minimum requirements expected of timing mechanisms of this kind, and also the test methods, are described in Swiss Standard NIHS90-10. This standard is concerned solely with the residual effect and not with the temporary disturbances of the timing mechanism in a magnetic field, as no means were known for bringing temporary disturbances to small values. The sole screening manner known was that of magnetically screening the timing mechanism in the housing. For the watchmaker the term "antimagnetic" means solely that the timing mechanism does not stop in the magnetic field, and that the residual effect lies below a specific value. However with this kind of watch, the public often assumes, falsely, that "antimagnetic" means that the watch will be free from any disturbance. Up to the present time it has not been found possible to eliminate all disturbances in mechanical watches and clocks without the use of a magnetic screen.

An object of the present invention is to provide a timekeeping mechanism which has improved antimagnetic characteristics.

SUMMARY OF THE INVENTION

In accordance with this invention it has surprisingly been found that not all operating parts of the timekeeping mechanism have to be made from anti-magnetic material, but that a truly anti-magnetic mechanism is obtained if the following elements are made of a material having a magnetic permeability $\mu$ of less than 1.01:

a. all parts mounted on the balance staff;
b. all parts mounted on the pallet arbor;
c. the escapement wheel which sits on the escapement drive and
d. the main portion of the balance staff.

In a customary watch mechanism the following elements are mounted on the balance staff or pallet arbor and thus should be made of a material of the indicated magnetic permeability:

| | |
|---|---|
| On pallet arbor : | 1. pallet |
| On balance staff : | 2. balance spring with collet |
| | 3. balance |
| | 4. roller table with roller pin |

BRIEF DESCRIPTION OF THE DRAWINGS

The aforementioned and other features of the invention will now be described with reference to the accompanying drawings, in which:

FIGS. 5 and 6 illustrate graphically the performance of watches constructed according to the present invention.

DETAILED DESCRIPTION OF THE INVENTION.

Figure 1:
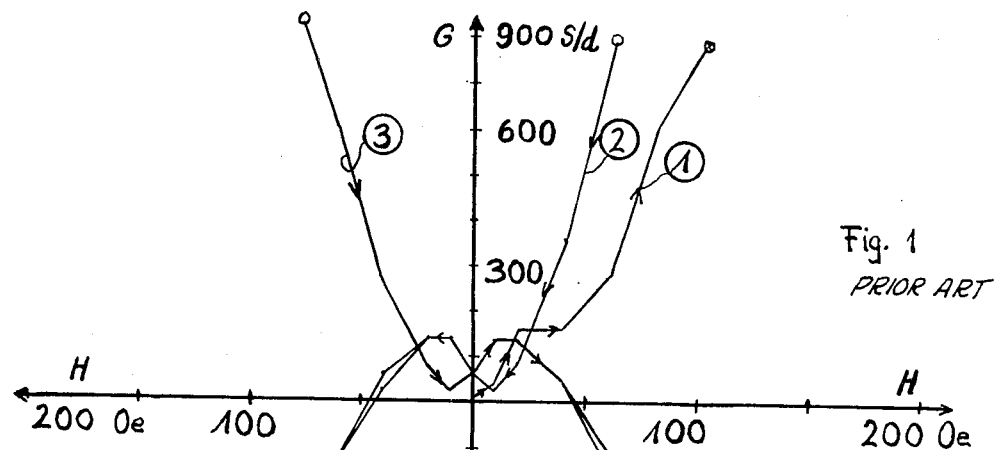
FIG. 1 illustrates graphically the performance of a watch of known construction in a magnetic field.

FIG. 1 illustrates graphically the performance of a branded watch, described as antimagnetic, with a "-Nivarox" spiral or balance spring. The watch is constructed with the "Nivarox" spiral spring which is weakly magnetic. In addition, it has a steel balance staff, a nickel plated roller table, nickel plated balance, and a non-magnetic escapement. The performance C is plotted as a function of the magnetic field strength H (in Oersteds) to which the timepiece was exposed.

Figure 2:
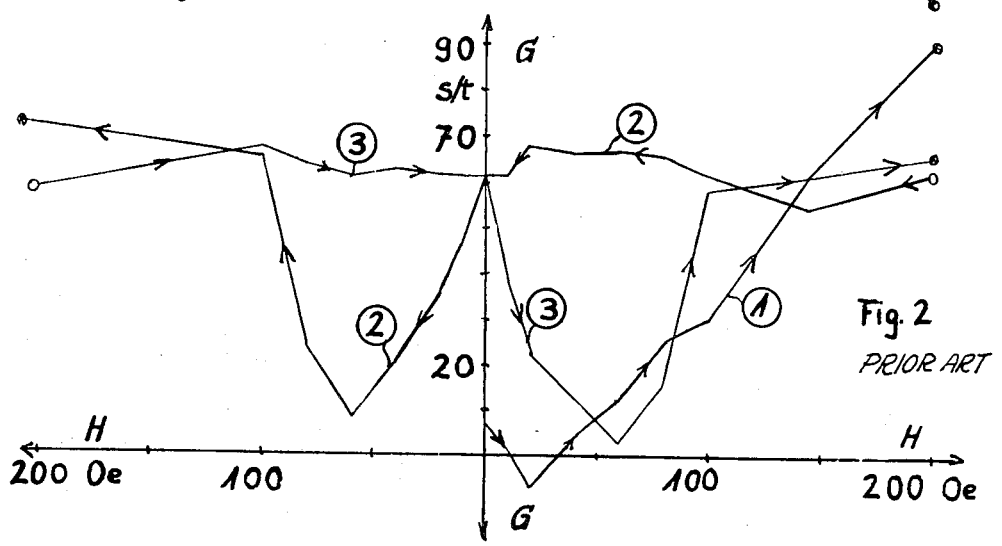
FIG. 2 illustrates graphically the residual effects on the same watch after it has been removed from the magnetic field.

FIG. 2 illustrates graphically the residual effect on the same watch, that is to say the curve G, after the timepiece has been removed from the influence of the magnetic field H, again measured in Oersted.

The curves are plotted so that the direction of the magnetic field falls into the plane of the timing mechanism i.e. about the condition when the timing mechanism can be the most severely perturbed. The initial curve designated 1, corresponds to the performance of the watch in terms of the inaccuracy of the watch, with G measured in seconds per day, when exposed to a field of expanding or increasing field strength. A curve 2 corresponds to the performance of the watch when the field strength is descreasing, and in which, at zero Oersted the field direction is inversed and increases again. A curve 3 concludes the cycle. The curves of the cycle of the magnetic field for the most part do not correspond to the new curve, because remanent fields occur in the case of all structural elements made of steel.

A watch of this kind stops in a magnetic field H of about 600 to 900 Oersted. It was possible to carry out a measurement of the performance of the time piece only in field strengths of up to 100 Oersted. When the watch was exposed to magnetic fields of higher field strength only the residual effect was measured. This residual effect rapidly rises. It was found that with the higher magnetic fields the watch recorded an error of at least 1 minute a day.

Figure 3:
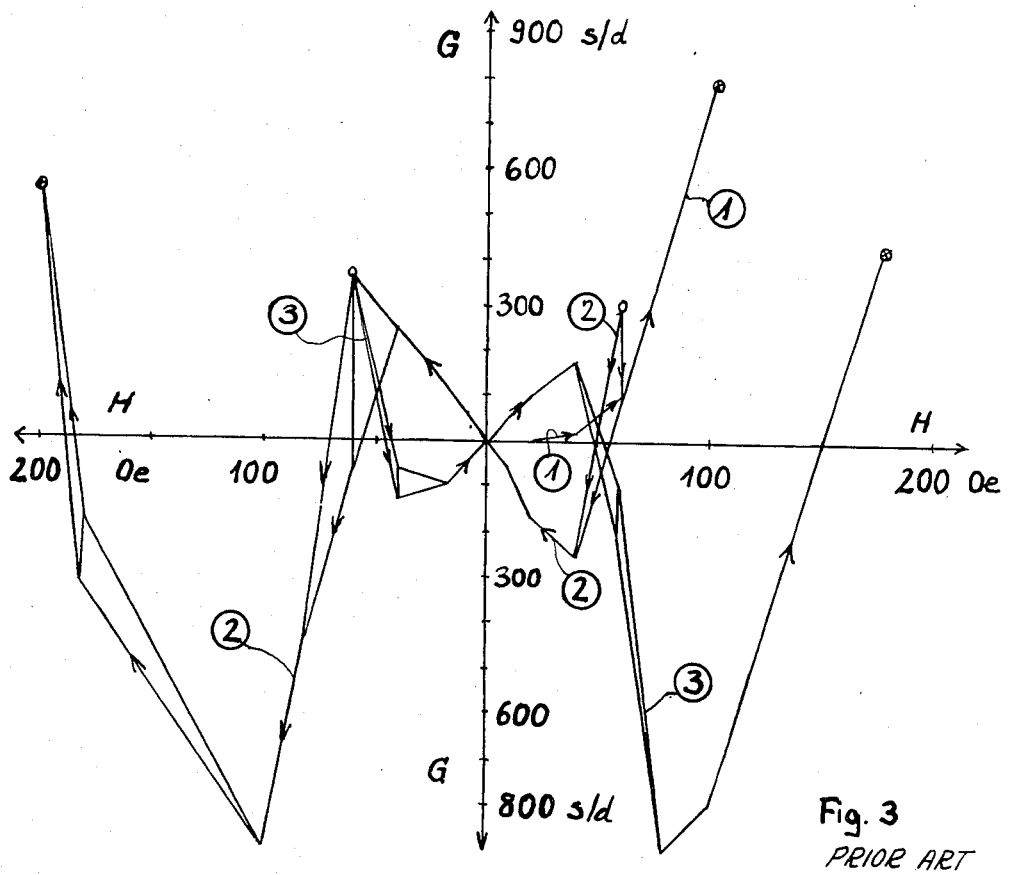
FIG. 3 illustrated graphically, for comparison with FIG. 1, the performance of the watch modified by replacing its balance spring by a balance spring of paramagnetic material.

FIG. 3 illustrates graphically the performance G (measured in seconds per day) of the watch after the magnetically sensitive balance spring has been replaced by a balance spring of paramagnetic material. It was found that the modified watch stopped in a magnetic field H of 600 to 900 Oersted.

Figure 4:
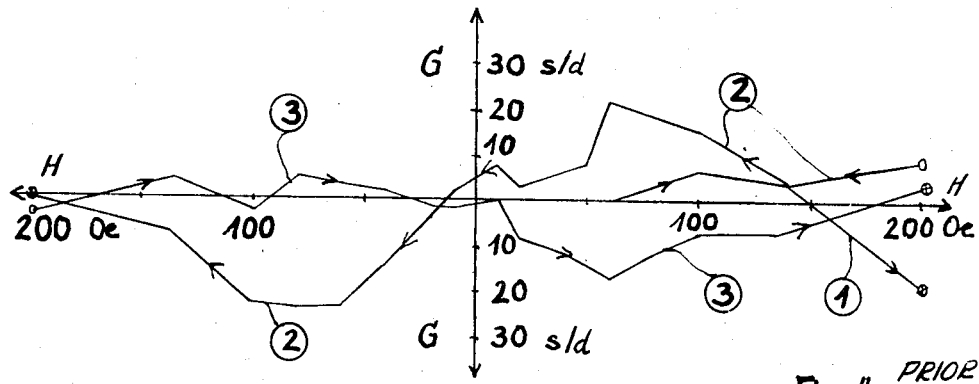
FIG. 4 illustrates graphically for comparison with FIG. 2 the residual effects on said modified watch.

FIG. 4 illustrated graphically the residual effect on the modified watch. However, in this instance the residual effect is appreciably smaller, as will be appreciated by comparing FIGS. 2 and 4. However, a watch of this kind is by no means what a purchaser really means when asking for a "non-magnetic watch."

According to the invention there is provided a watch with improved antimagnetic characteristics which has a timekeeping mechanism in which all the parts mounted on the balance staff, all parts mounted on the pallet arbor, the escapement wheel mounted on the escapement drive, and at least the main part of the material of the balance staff consist solely of materials having a magnetic permeability $\leq 1.01$. Materials, having a magnetic permeability $\leq 1.01$, are described by engineers as non-magnetic, whereas materials having a magnetic permeability $\mu \geq 1.01$ are described as magnetic. The stipulation that all the abovementioned parts must only consist of non-magnetic materials means, inter alia, that no part may exhibit a surface treated with layers of magnetic materials; this rules out the step of coating parts with a galvanically applied thin nickel layer prior to gold plating. Hitherto such a step has been adopted in horological practice, with a view to imparting a better lustre to the gold layer. The stipulation that at least the main portion of the material of the balance staff should consist of non-magnetic material such as brass, a hardenable bronze, an austenitic non-rusting steel, or a synthetic plastics material, means that this balance staff may consist either entirely of a material of this kind or that it may contain bearing pins which are, for example, made of steel but which are arranged in a spindle or shaft which consists of non-magnetic material. A construction in which the pins are made of steel, may be necessary when specifications are made relating to the pins, for example, in relation to resistance to breakage, hardness, resistance to abrasion, are such that the only materials suitable for the pins are magnetic materials. In such a watch, the length of bearing pins should be limited to about 1/6th of the total length of the staff. With such a staff, the effects of magnetic fields and magnetic moments are reduced because the magnetic moments of the two individual pins are, in themselves, small and the induced torque phenomena in each of them acts in opposition to that induced in the respective other one. The necessary resistance to abrasion and the necessary hardness of the pins in the region of the bearings can be attained by coating the pins with a layer of metal (for example Cr, Rh); said layer being applied galvanically, chemically or from a gaseous phase.

Advantageously, the balance spring may be formed from a paramagnetic material or an antiferromagnetic material, for example one of the materials disclosed in pending application Ser. No. 796298 and pending application Ser. No. 631.686 assigned to the same assignee.

Brass, nickel silver, copper-beryllium or age-hardenable bronze may be employed for the balance, the roller table, the collet, for the pallet and for the escapement wheel, since these materials will have a permeability $\mu$ lying between 1.0001 and 1.005.

FIGS. 5 and 6 illustrate graphically the performance of watches constructed according to the invention which comprise a balance, an escapement and a roller table formed from age-hardenable bronze and with a paramagnetic balance spring.

FIG. 5 illustrates graphically the performance of a watch with a balance staff made of brass and with embedded steel pins. Whereas, FIG. 6 illustrates the performance of a watch with a balance staff which is formed entirely from hardenable bronze. The residual effects are smaller than the momentary fluctuations in performance in both instances.

When FIGS. 5 and 6 are compared with FIGS. 1 to 4, it should be borne in mind that, in the case of FIGS. 5 and 6, the scale is four times smaller for the magnetic field and 2.5 times greater for the performance G; if this adjustment were not made, it would be impossible to plot any measurement values at all. Thus, magnetic fields of even 1,000 Oersted do not lead to any serious disturbances.

Figure 7:
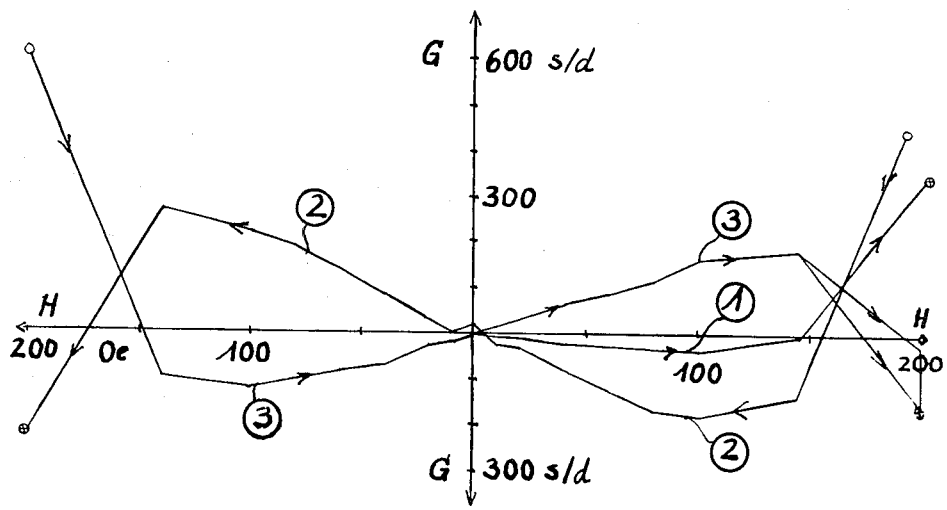
FIG. 7 illustrates graphically, for contrast, the performance of a watch with a balance staff made of steel when exposed to a magnetic field.
Figure 8:
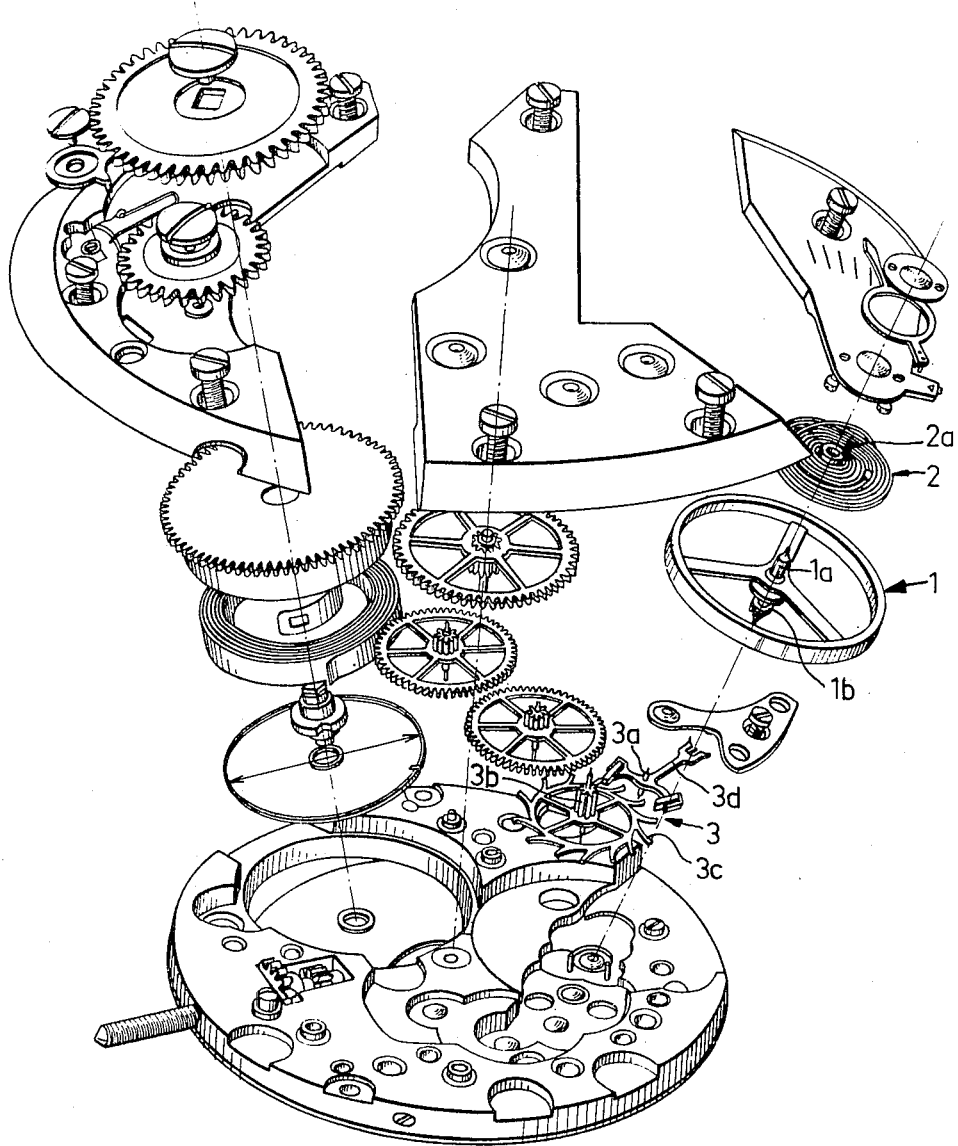
FIG. 8 is an exploded view of a watch mechanism.
Figure 9:
FIG. 9 shows the roller table with the roller pin of the mechanism.

In contrast FIG. 7 shows the performance G of a watch which is provided with a balance staff made of steel. The exploded view of FIG. 8 indicates a conventional watch mechanism in which all parts that are mounted on the balance staff and the pallet arbor, the excapement wheel as well as at least the main portion of the balance staff are made of a material having a magnetic permeability of less than 1.01. In this manner, the entire regulating mechanism is rendered truly antimagnetic in the sense of this invention.

In the drawings, the following reference numerals indicate the following parts:

| Reference Numeral | Part |
| --- | --- |
| 1 | balance |
| 1a | balance staff |
| 1b | roller table with roller pin |
| 2 | balance spring |
| 2a | collet |
| 3 | escapement |
| 3a | pallet arbor |
| 3b | pinion for escapement wheel |

| | |
|---|---|
| 3c | escapement wheel |
| 3d | pallet |

It is apparent from these Figures in the examples given that only the watch constructed according to the invention exhibits the characteristics which the purchaser might reasonably expect from a non-magnetic watch described as "antimagnetic."

Subject to the condition that the residual effect always disappears, the working expedient of making the greater part of the moving parts of the timepiece of non-magnetic metal leads to constructive principles which also render the temporary effect small when the watch is exposed to a magnetic field. Thus, the temporary effect is insignificant for a field strength of up to about 400 Oersted, if the balance and the main part of the balance staff, balance spring collet, roller table, pallet, pallet wheel are from material having a permeability $\mu$ of $\leq 1.01$. If the balance staff is entirely made of non-magnetic material, then the temporary effect is insignificant for field strengths of up to 2 kilo Oersted. The temporary effect is insignificant up to nearly 10 kilo Oersted if the escapement drive and the pallet arbor are also made of non-magnetic material.

We claim:

1. In a time-keeping mechanism having magnetic operating parts and containing a balance, a balance staff, a balance spring with collet, a roller table, a roller pin, an escapement including an escapement drive and an escapement wheel mounted on the escapement drive, a pallet and a pallet arbor, the improvement which comprises that all parts of the time-keeping mechanism that are mounted on the balance staff and on the pallet arbor, said escapement wheel, as well as at least the main portion of the balance staff are made of a material having a magnetic permeability $\mu < 1.01$.

2. In a timekeeping mechanism, the improvement defined in claim 1, comprising a non-magnetic layer applied, at least at bearing points, to each of the balance staff, the escapement drive and the pallet arbor.

3. In a timekeeping mechanism, the improvement defined in claim 1, wherein the escapement drive is formed solely from material having a magnetic permeability $\mu \leq 1.01$.

4. In a timekeeping mechanism, the improvement defined in claim 1, wherein the pallet arbor is formed solely from material having a magnetic permeability $\mu \leq 1.01$.

5. In a timekeeping mechanism, the improvement defined in claim 1, wherein the balance spring is formed from a paramagnetic metal having a permeability $\mu$ below 1.01.

6. In a timekeeping mechanism, the improvement defined in claim 1, wherein the balance spring is formed from an antiferromagnetic metal having a permeability $\mu$ below 1.01.

7. In a timekeeping mechanism, the improvement defined in claim 1, wherein the balance and the parts mounted on the balance staff are formed from a material selected from the group consisting of a monel metal, nickel silver, copper beryllium alloy, and a copper-manganese nickel alloy.

8. In a timekeeping mechanism, the improvement defined in claim 1, wherein the pallet arbor and the escapement wheel are formed from a material selected from the group consisting of nickel silver, a copper-beryllium alloy, and a copper manganese nickel alloy.

9. The improvement as claimed in claim 1, wherein said parts mounted on said pallet arbor and balance staff and made from said material are said pallet, said balance, said balance spring with collet, said roller table and said roller pin.

10. A time-keeping mechanism as defined in claim 1, wherein the balance staff comprises bearing pins, said balance staff with the exception of said bearing pins being entirely formed from a material having a magnetic permeability $\mu < 1.01$.

11. In a timekeeping mechanism, the improvement defined in claim 1, wherein the whole of the balance staff is formed from a material having a magnetic permeability $\mu \leq 1.01$.

12. In a timekeeping mechanism, the improvement defined in claim 3, wherein the balance staff is formed from a hardenable bronze.

* * * * *